(12) United States Patent
Stockmar et al.

(10) Patent No.: US 11,660,859 B2
(45) Date of Patent: May 30, 2023

(54) PRINTING DEVICE AND METHOD FOR DETERMINING PRINT SPEED-DEPENDENT PRINT DATA FOR THE OPERATION OF A NOZZLE

(71) Applicant: Canon Production Printing Holding B.V., Venlo (NL)

(72) Inventors: Martin Stockmar, Poing (DE); Timo Sponer, Markt Schwaben (DE); Martin Wilhelm, Maitenbeth (DE); Robert Baumgartner, Wörth (DE); Christoph Rummelsberger, Ismaning (DE); Markus Keller, Schrobenhausen (DE)

(73) Assignee: Canon Production Printing Holding B.V., Venlo (NL)

( * ) Notice: Subject to any disclaimer, the term of this patent is extended or adjusted under 35 U.S.C. 154(b) by 92 days.

(21) Appl. No.: 17/237,366

(22) Filed: Apr. 22, 2021

(65) Prior Publication Data

US 2021/0331464 A1    Oct. 28, 2021

(30) Foreign Application Priority Data

Apr. 23, 2020    (DE) .......................... 102020111099.5

(51) Int. Cl.
*B41J 2/045* (2006.01)
*G06K 15/10* (2006.01)
*G06K 15/02* (2006.01)

(52) U.S. Cl.
CPC ....... *B41J 2/04541* (2013.01); *B41J 2/04573* (2013.01); *B41J 2/04598* (2013.01); *G06K 15/102* (2013.01); *G06K 15/1836* (2013.01); *G06K 15/1881* (2013.01)

(58) Field of Classification Search
CPC .................................................. B41J 2/04596
See application file for complete search history.

(56) References Cited

U.S. PATENT DOCUMENTS

| | | | |
|---|---|---|---|
| 9,120,306 B2 | 9/2015 | Buschmann | |
| 9,205,645 B2 | 12/2015 | Koerner | |
| 9,302,474 B2 | 4/2016 | Koerner et al. | |
| 2011/0242153 A1* | 10/2011 | Kanzaki | B41J 2/04573 347/5 |
| 2015/0321472 A1* | 11/2015 | Koerner | B41J 2/04586 347/14 |
| 2016/0067964 A1* | 3/2016 | Hitzlsperger | B41J 2/04586 347/10 |
| 2017/0190171 A1* | 7/2017 | Sponer | B41J 2/0451 |

FOREIGN PATENT DOCUMENTS

| | | |
|---|---|---|
| DE | 10 2012 110 187 A1 | 4/2014 |
| DE | 10 2014 101 428 A1 | 8/2015 |
| DE | 10 2014 106 424 A1 | 11/2015 |

OTHER PUBLICATIONS

German Action dated Dec. 3, 2020, Application No. 10 2020 111 099.5.

* cited by examiner

*Primary Examiner* — Shelby L Fidler
(74) *Attorney, Agent, or Firm* — The Webb Law Firm

(57) ABSTRACT

In the print data for a nozzle of a printer, white dots are replaced by pre-ejection pulses. One or more repetitions of the pre-ejection pulses may be inserted into the print data, depending on the actual print speed of the printer, to determine print speed-dependent print data with which the nozzle is activated to print a print image with high print quality.

10 Claims, 3 Drawing Sheets

PRINTING DEVICE AND METHOD FOR DETERMINING PRINT SPEED-DEPENDENT PRINT DATA FOR THE OPERATION OF A NOZZLE

CROSS REFERENCE TO RELATED APPLICATIONS

This patent application claims priority to German Patent Application No. 10 2020 111 099.5, filed Apr. 23, 2020, which is incorporated herein by reference in its entirety.

BACKGROUND

Field

The disclosure relates to an inkjet printing device. In particular, the disclosure relates to a method with which the print quality of an inkjet printing device may be improved.

Related Art

Inkjet printing devices may be used to print to recording media (such as paper, for example). For this purpose, typically a plurality of nozzles is used in order to fire ink droplets onto the recording medium, and thus to generate a desired print image on the recording medium.

Given intermittent non-usage, a nozzle of an inkjet printing device may be impaired in terms of its function, or possibly dry out, depending on the characteristic of the ink that is used, on the ambient climate, on the print image etc. This may lead to a reduced print quality or to errors in the print image.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure. The connections shown in the figures between functional units or other elements can also be implemented as indirect connections, wherein a connection can be wireless or wired. Functional units can be implemented as hardware, software or a combination of hardware and software.

An object of the present disclosure is to provide a system and method for durably increasing the print quality of an inkjet printing device (printer).

According to one aspect of the disclosure, a method is described for determining print speed-dependent print data for the operation of at least one nozzle of an inkjet printing device. The method includes the determination of image content-dependent print data on the basis of basic print data for the print image to be printed, wherein the basic print data respectively indicate, for a sequence of lines of the print image, whether a non-white dot or a white dot is to be printed by the nozzle. The determination of the image content-dependent print data includes the replacement of at least one data set for a white dot with a data set for a pre-ejection pulse.

The method also includes the determination of print speed-dependent print data on the basis of the image content-dependent print data, via insertion one or more repetitions of the pre-ejection pulse depending on the actual print speed with which the successive lines of the print image are to be printed on the recording medium. Furthermore, the method includes controlling the nozzle to print the print image on the basis of the print speed-dependent print data.

According to a further aspect of the disclosure, an inkjet printing device is described. The printing device comprises at least one nozzle that is designed to print dots for a sequence of lines of a print image on a recording medium. Furthermore, the printing device comprises at least one control means that is configured to determine image content-dependent print data on the basis of basic print data for the print image to be printed. The control means is also configured to determine print speed-dependent print data on the basis of the image content-dependent print data, via insertion of one or more repetitions of a pre-ejection pulse, which print speed-dependent print data are used for controlling the nozzle to print the print image.

Figure 1:
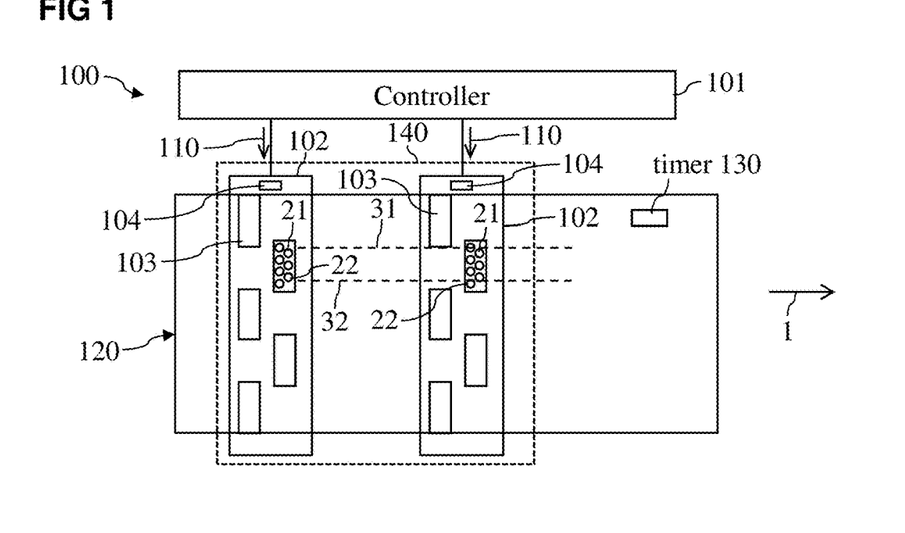
FIG. 1 a block diagram of an inkjet printing device according to an exemplary embodiment.

The printing device 100 depicted in FIG. 1 is designed for printing to a recording medium 120 in the form of a sheet or page or plate or belt. The recording medium 120 may be produced from paper, paperboard, cardboard, metal, plastic, textiles, a combination thereof, and/or other materials that are suitable and can be printed to. The recording medium 120 is directed through the print group 140 of the printing device 100 along the transport direction 1 (represented by an arrow).

In the depicted example, the print group 140 of the printing device 100 comprises two print bars 102, wherein each print bar 102 may be used for printing with ink of a defined color, for example black, cyan, magenta, and/or yellow, and if applicable MICR ink. Furthermore, the printing device 100 typically comprises at least one fixer or dryer that is configured to fix a print image printed onto the recording medium 120.

The printing device 110 also comprises a timer 130, in particular an encoder, which is configured to determine the line timing for printing of successive lines of a print image. The timer 130 may in particular be configured to determine velocity information with respect to the transport velocity of the recording medium 120, and based thereupon to provide line timing signals for successive lines. Given a fixed dot resolution along the columns 31, 32 of a print image, the transport or feed velocity of the recording medium 120 corresponds to the print speed of the printing device 100. In other words, given use of a fixed dot resolution, a variation of the transport or feed speed of the recording medium 120 leads to a corresponding variation of the print speed of the printing device 100.

A print bar 102 may comprise one or more print heads 103 that are arranged side by side in a plurality of rows in order to print the dots of different columns 31, 32 of a print image onto the recording medium 120. In the example depicted in FIG. 1, a print bar 102 comprises five print heads 103, wherein each print head 103 prints the dots of a group of columns 31, 32 of a print image onto the recording medium 120.

In the embodiment depicted in FIG. 1, each print head 103 of the print group 140 comprises a plurality of nozzles 21, 22, wherein each nozzle 21, 22 is configured to fire or eject ink droplets onto the recording medium 120. A print head 103 of the print group 140 may comprise multiple thousands of effectively utilized nozzles 21, 22, for example, that are arranged along a plurality of rows transverse to the transport direction 1 of the recording medium 120. By means of the nozzles 21, 22 of a print head 103 of the print group 140, dots of a line of a print image may be printed onto the recording medium 120 transverse to the transport direction 1, meaning along the width of the recording medium 120.

In an exemplary embodiment, the printing device (printer) 100 also comprises a controller 101 that is configured to coordinate the operation of the different print bars 102. In particular, the controller 101 may be configured to send print data 110 to be printed to controllers 104 of the individual print bars 102. The controller(s) 104 may be referred to as print bar controller(s). The print data 110 may thereby respectively indicate, for every single nozzle 21, 22 and for every single line of the print image to be printed, whether an ink droplet should be ejected in order to print a non-white dot onto the recording medium 120, or whether no ink droplet should be ejected in order to print a white dot onto the recording medium 120. In an exemplary embodiment, the controller 101 and/or controller(s) 104 include processing circuitry that is configured to perform one or more functions and/or operations of the controller 101 and/or controller(s) 104, respectively.

The print data 110 provided to a controller 104 are typically independent of the transport velocity of the recording medium 120 and/or independent of the line timing or the print speed of the printing device 120. In an exemplary embodiment, the controller 104 of a print bar 102 is configured to activate the individual nozzles 21, 22 of the one or more print heads 103 of the print bar 102 depending on the line timing and depending on the provided print data 110, in order to print the print image line by line onto the recording medium 120.

The print group 140 of the printing device 100 thus comprises at least one print bar 102 having K nozzles 21, 22 that may be activated with a defined line timing or with a defined activation frequency in order to print lines traveling transverse to the transport direction 1 of the recording medium 120 onto the recording medium 120 with K pixels or K columns 31, 32 of a print image, for example with K>1000. The line timing thus indicates with what timing lines of a print image are printed on a recording medium 120. The activation frequency thereby typically corresponds to the line clock, such that the lines 21, 22 of a print head 103 or print bar 102 are activated precisely once per line of a print image to be printed. In particular, the actuator of a nozzle 21, 22 may be activated for a line—with what is known as an ejection pulse—in order to produce an ink ejection for a (non-white) dot in a line, or be activated in order to produce no ink ejection so that a white dot appears in the line. In the depicted example, the nozzles 21, 22 are installed immobile or fixed in the printing device 100, and the recording medium 120 is directed past the stationary nozzles 21, 22 with a defined transport velocity. Given a constant dot resolution along the transport direction 1, the line timing or the activation frequency is correspondingly changed by changing the transport velocity.

Figure 2:
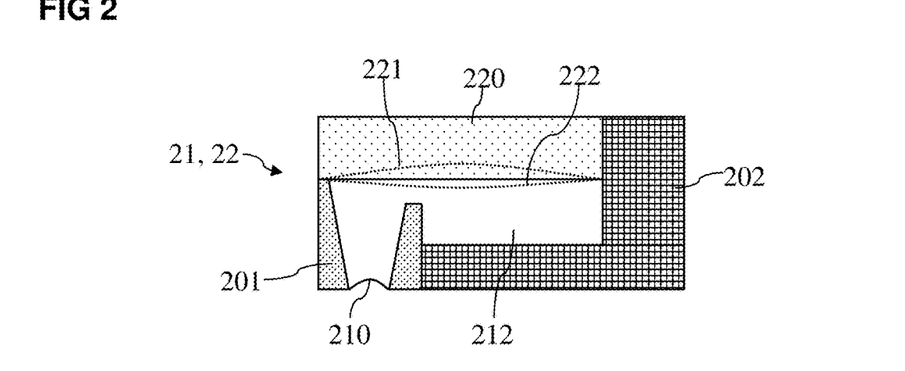
FIG. 2 illustrates a nozzle according to an exemplary embodiment.

FIG. 2 shows an example of a design of a nozzle arrangement, or nozzle 21, 22, of a print head 103. The nozzle 21, 22 comprises walls 202 which, together with an actuator 220 and a nozzle opening 201, form a receptacle or a chamber 212 to receive ink. Via the nozzle opening 201 of the nozzle 21, 22, an ink droplet 131 may be fired or shot onto the recording medium 120. The ink at the nozzle opening 201 forms what is known as a meniscus 210. Furthermore, the nozzle 21, 22 comprises an actuator 220, for example a piezoelectric element, which is configured to vary the volume of the chamber 212 for receiving the ink, or to vary the pressure in the chamber 212 of the nozzle 21, 22. In particular, as a result of a deflection 222, the volume of the chamber 212 may be reduced by the actuator 220, and thus the pressure in the chamber 212 may be increased. An ink droplet 131 may thus be ejected from the nozzle 21, 22 via the nozzle opening 201. FIG. 2a shows a corresponding deflection 222 of the actuator 220. Moreover, the volume of the chamber 212 may be increased by the actuator 220 (see deflection 221) in order to draw new ink into the receptacle or into the chamber 212 via an intake (not shown in FIG. 2).

Via a deflection 221, 222 of the actuator 220, the ink within the nozzle arrangement 200 may thus be moved and the chamber 212 may be placed under pressure. A defined movement of the actuator 220 thereby produces a corresponding defined movement of the ink or of the meniscus 210. The defined movement of the actuator 220 is typically produced by a corresponding defined waveform or a corresponding defined pulse of an activation signal of the actuator 220. In particular, via a fire pulse (which may also be referred to as an ejection pulse) to activate the actuator 220 it may be produced that the nozzle 21, 22 ejects an ink droplet 131 via the nozzle opening 201. Different ink droplets 131 may be ejected via different activation signals or ejection pulses at the actuator 220. In particular, ink droplets 131 having different droplet sizes (for example 5 pl, 7 pl, or 12 pl) may thus be ejected. Furthermore, via a prefire pulse (which may also be referred to as a pre-ejection pulse)

to activate the actuator 220 it may be produced that, although the nozzle 21, 22 produces a movement of the ink and a vibration of the meniscus 210, no ink droplet 131 is ejected via the nozzle opening 201.

If a nozzle 21, 22 is not activated to produce an ink ejection for a relatively long period of time, this may lead to the situation that the viscosity of the ink increases in the chamber 212 of the nozzle 21, 22, whereby a subsequent ink ejection, and therefore the print quality of the printing device 100, may be negatively affected. Pre-ejection pulses may be used to decrease the viscosity of the ink in the chamber 212 of a nozzle 21, 22 in preparation for an ink ejection, and to increase the print quality as a result of this. The present document describes a method that enables a flexible, efficient, and optimized utilization of pre-ejection pulses in a printing device 100 with variable transport velocity or print speed.

Figure 3A:
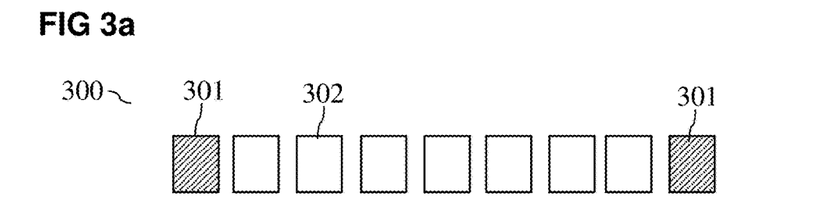
FIG. 3a illustrates examples of print data for a nozzle for printing successive lines according to exemplary embodiments.

FIG. 3a shows print data 300 for a column 31, 32 of a print image, i.e. for a nozzle 21, 22 of a printing device 100. The print data 300 comprise a sequence of data sets 301, 302 for a corresponding sequence of successive lines of the print image. The print data 300 thereby exclusively comprise information as to whether a non-white dot or a white dot should be printed in a line of the print image. The ink quantity to be ejected may thereby be specified for a non-white dot. The print data 300 describing exclusively the print image are also referred to as basic print data in this document. The basic print data 300 comprise one or more data sets 301 for non-white dots via which an ejection of a dot is produced, and one or more data sets 302 for white dots via which no ejection of ink droplets is produced.

As presented further above, a relatively long pause between the printing of non-white dots may lead to the situation that the print quality of a nozzle 21, 22 is negatively affected. In an exemplary embodiment, the controller 101 of the printing device 100 may be configured to replace one or more data sets 302 for white dots with one or more corresponding data sets 303 for pre-ejection pulses, depending on the basic print data 300, and possibly depending on the print speed or transport velocity, as depicted by way of example in FIG. 3b. In particular, directly in advance of a data set 301 for a non-white dot, one or more data sets 302 for white dots may be replaced by one or more corresponding data sets 303 for pre-ejection pulses. The number of pre-ejection pulses may thereby depend on the number of lines in which no non-white dot has been printed. In particular, the number of inserted pre-ejection pulses may increase with the number of lines in which no non-white dot are printed.

Figure 3B:
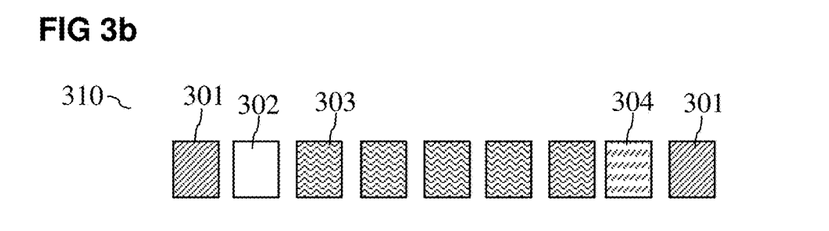
FIG. 3b illustrates examples of image content-dependent print data according to exemplary embodiments.

A data set 304 for a rest phase may be inserted or provided directly before the data set 301 for a non-white dot. If applicable, a data set 302 for a white dot may be replaced by a data set 304 for a rest phase. Alternatively, the data set 302 for a white dot may be maintained as a rest phase. In the rest phase, it may be brought about that the meniscus 210 of the nozzle 21, 22 may rest in advance of the printing of a non-white dot. The print quality may thus be further increased.

By replacing data sets 302 for white dots with data sets 303 for pre-ejection pulses, or if applicable with a data set 203 for a rest phase, a sequence of modified data sets 301, 302, 303, 304 may be provided, which is also referred to in this document as image content-based print data 310. The image content-based print data 310 comprise, in particular comprise precisely, one data set 301, 302, 303, 304 for each line of the print image to be printed. The image content-based print data 310 are thereby, if applicable, independent of the print speed of the printing device 100. The image content-based print data 310 typically comprise the same number of data sets, in particular the same number of bits or bytes, as the basic print data 300.

The image content-based print data 310 may be transmitted as print data 110 from the controller 101 of the printing device 100 to the controller 104 of a print bar 102 or of a print head 103.

In an exemplary embodiment, the controller 104 of a print bar 102 or of a print head 103 may be configured to take into account the print speed or the line timing upon controlling a nozzle 21, 22 of a print head 103. It may thereby occur that the time interval between the printing of two directly successive lines of a print image to be printed is relatively large due to a relatively low print speed, for example if the printing device 100 is operated in an inspection mode, or if the print speed ramped up or ramped down. This may in turn lead to an increased viscosity of the ink in a nozzle 21, 22, and thus to a reduced print quality.

Figure 3C:
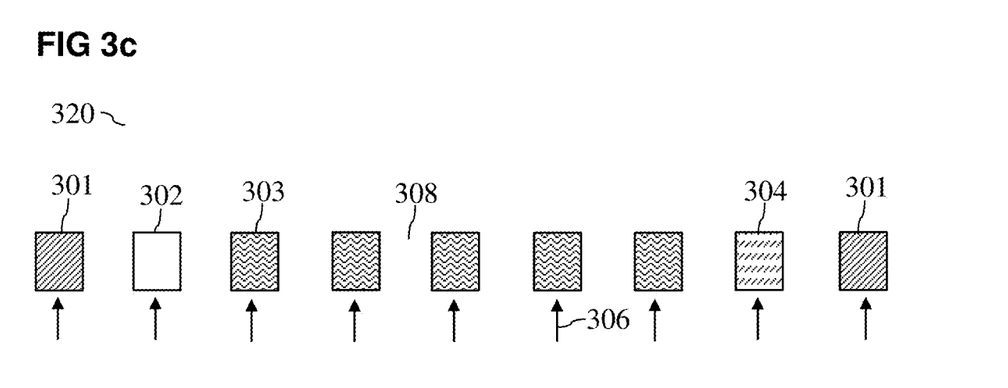
FIG. 3c illustrates image content-dependent print data, given consideration of the actual print speed of the printing device, according to an exemplary embodiment.

In an exemplary embodiment, the controller 104 may be configured to generate temporally extended print data 320 on the basis of the image content-based print data 310, as shown by way of example in FIG. 3c. The temporally extended print data 320 thereby comprise a data set 301, 302, 303, 304 for each line of the print image or for each line timing signal 306 that is provided by the timer 130 to identify a new line. Moreover, the temporally extended print data 320 may have intervening spaces 308 between directly successive data sets 301, 302, 303, 304 for one or more additional data sets between two directly successive line clock signals 306. The one or more additional data sets may be arranged at one or more virtual line timing signals 307.

The number of virtual line timing signals 307 that are inserted between two directly successive real line timing signals 306 may depend on the print speed; and
the maximum possible activation frequency of the nozzle 21, 22, or of the print head 103.

Typically, the number of virtual line timing signals 307 increases with decreasing print speed. It may be assumed that the nozzle 21, 22 is operated with the maximum possible activation frequency given a maximum possible or nominal print speed. If the actual print speed is ½ of the maximum possible or nominal print speed, precisely one virtual line timing signal 307 may be inserted. If the actual print speed is ⅓ of the maximum possible or nominal print speed, two virtual line timing signals 307 may be inserted. If the actual print speed is 1/N of the maximum possible or nominal print speed, (N−1) virtual line timing signals 307 may be inserted.

Figure 3D:
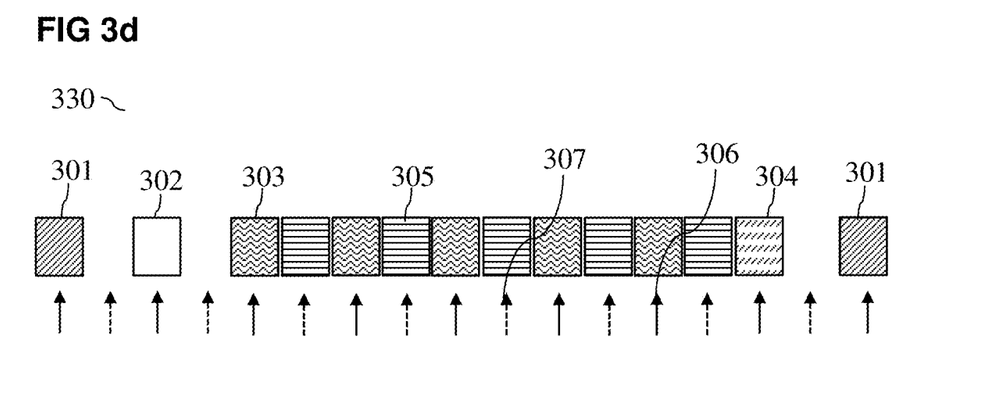
FIG. 3d illustrates examples of print speed-dependent print data according to an exemplary embodiment.

The virtual line timing signals 307 may be used at least in part to regenerate the ink of the nozzle 21, 22. In particular, the controller 104 may be configured to produce a repetition of a pre-ejection pulse at a virtual line timing signal 307. In other words, a data set 305 for a repetition of the data set 303 of the preceding actual line timing signal 306 may be inserted at a virtual line timing signal 307, as depicted by way of example in FIG. 3d. In the example depicted in FIG. 3d, a data set 305 for a repetition was inserted following each data set 303 for a pre-ejection pulse. Via the data set 304 for a repetition, the nozzle 21, 22 may be induced to repeat the pulse that was produced at the preceding real line timing signal 306. Additional pre-ejection pulses of the nozzle 21, 22 may thus be efficiently and reliably produced in order to avoid the nozzle 21, 22 drying out given a relatively low print speed. The sequence of data sets 301, 302, 303, 304, 305 with repetitions at virtual line timing signals 307 between two actual line timing signals 306 may be referred to as print speed-dependent print data 330.

Figure 4:
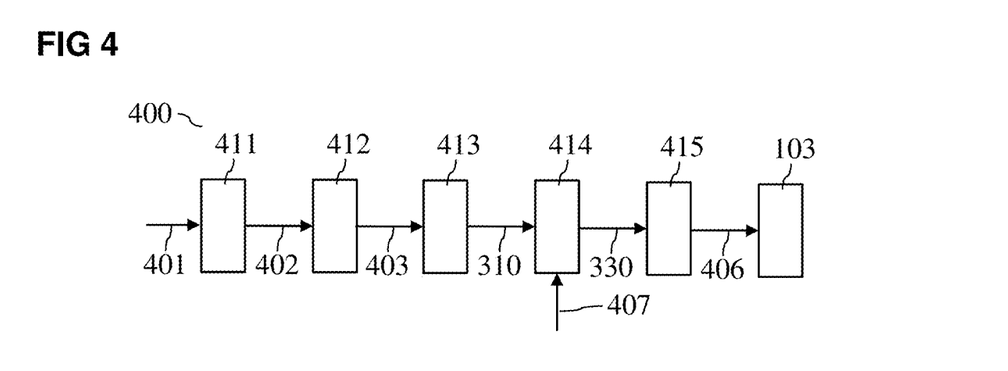
FIG. 4 illustrates an example of processing of print data according to an exemplary embodiment.

FIG. 4 shows an example of processing 400 of print data for a print image. The image data 401 for a print image to be printed, for example the image data 401 from a PDF file, may be transformed via a rastering process 411 into rastered image data 402. The rastered image data 402 may be transformed into a halftone image 403 via a halftone conversion 412. The halftone 403 may thereby correspond to the basic print data 300 for operating the nozzles 21, 22 of a print head 103. The image content-dependent print data 310 may be generated via the insertion 413 of image content-dependent pre-ejection pulses. The print speed-dependent print data 330 may be generated via insertion 414 of repetitions at virtual lines or line timing signals 307, taking into account print speed information 407 with respect to the sprint speed. The print speed-dependent print data 330 may then be adapted (step 415) to the arrangement of nozzles 21, 22 in a print head 103 in order to provide control data 406 for the nozzles 21, 22 of the print head 103.

A combination of an image-dependent insertion of prefire pulses and an insertion of prefire pulses into time gaps between successive lines is thus described. Via the combination, both the image dependency and the frequency dependency or line timing dependency may thus be efficiently and reliably taken into account for the generation of prefire pulses.

The starting point is a bitmap for a defined nozzle 21, which bitmap is referred to in this document as basic print data 300. The basic print data 300 include data sets 301 for colored or non-white dots for which the nozzle 21, 22 respectively generates a droplet, and data sets 302 for white dots for which the nozzle 21, 22 does not generate a droplet.

Depending on the image content, a defined number of white dots, i.e. data sets 302, may then be replaced by prefire dots, i.e. by data sets 303, that lead to a refreshing of the nozzle 21, 22 before the nozzle 21, 22 needs to generate a droplet again due to a placed color or non-white dot, i.e. due to a data set 301. A certain rest period, i.e. a data set 304, may be provided at one or more white dots so that the nozzle 21, 22 may come to a rest before the generation of the next droplet. The print data 310 resulting due to the replacement of white dots by pre-ejection pulses are referred to in this document as image content-dependent print data.

In the event that the print speed of the printing device 100 does not correspond to the nominal print speed, the nozzle 21, 22 is actually not excited with the image content-dependent print data 310, but rather with the temporally extended print data 320. FIG. 3c shows an example in which the actual print speed is ½ of the nominal print speed. The arrows indicate the feed of the recording medium 120 by a respective line, and thus the actual line timing signals 306 or the actual excitation of the nozzle 21, 22.

From FIG. 3c it is apparent that the nozzle 21, 22 is, if applicable, excited only at relatively long time intervals, depending on the print speed, and might dry up as a result of this. Given actual print speeds that are below the nominal print speed, the repetition of the respective last pre-ejection pulse (also referred to as a prefire pulse) may take place. The one or more prefire pulses may thereby be inserted with the maximum possible frequency within the existing time gaps 308 up to the next excitation of the nozzle 21, 22, i.e. up to the next actual line timing signal 306, based on the image content-based print data 310. It may thus be ensured that the nozzle is refreshed with a sufficiently high intensity and does not dry up again between the individual prefire vibrations.

The print data resulting due to the insertion of repetitions are referred to as print speed-based print data 330 in this document.

Via the measures described in this document, it may be produced that the individual nozzles 21, 22 of a printing device 110 are activated, and therefore refreshed, with an approximately constant frequency of prefire pulses, nearly independently of the actual feed speed of the recording medium 120. A particularly efficient sequence of prefire pulses may thus be produced. In particular, a drying up of ink between individual prefire vibrations given a relatively slow feed speed of the recording medium 120 may be reliably avoided.

Via the measures described in this document, it may be produced that a decrease of the feed speed increases the number of prefire pulses at a nozzle 21, 22, since the time gaps 308 between feed-controlled excitations of the nozzle 21, 22, i.e. between the actual line timing signals 306, become increasingly larger. This corresponds to the desired physical effect of a stronger refreshing of the nozzle 21, 22 given increase of the inactive time between two ejected ink droplets.

If only image content-dependent prefire pulses are inserted without using print speed-dependent repetitions and/or without taking the print speed into account, it is typically necessary to replace a relatively large number of white dots with prefire pulses in order to achieve a sufficient refreshing of the nozzles 21, 22 even for relatively slow print speeds. This may lead to negative effects on the print quality at relatively high print speeds, depending on the type of ink. In particular, an optimized print quality for different print speeds typically cannot be enabled via exclusively the insertion of image content-dependent prefire pulses.

Via the measures described in this document, the number of image content-dependent prefire pulses may be reduced and/or be optimized for the nominal print speed, since the number of prefire pulses is automatically increased via the insertion of repetitions given relatively slow print speed.

If applicable, via the actual feed velocity, the speed information 407 may already be taken into account in the insertion of the image content-dependent prefire pulses, for example in order to reduce the number of white dots that are replaced by prefire pulses. The operation of the printing device 100 may thus be further optimized. Via the mechanism described in this document, the time gaps 308 that arise given a relatively slow print speed may then be filled up with repetition prefire pulses. By taking the print speed into account in the insertion of the image content-dependent prefire pulses, it may be efficiently and reliably prevented that a nozzle 21, 22 is activated with too high a number of prefire pulses at a relatively slow print speed, which might lead to a reduced print quality depending on the properties of the ink, the nozzle 21, 22, and/or depending on ambient conditions. For example, an excessive number of prefire pulses may lead to a clumping of the ink and to a clogging of the nozzle 21, 22.

Figure 5:
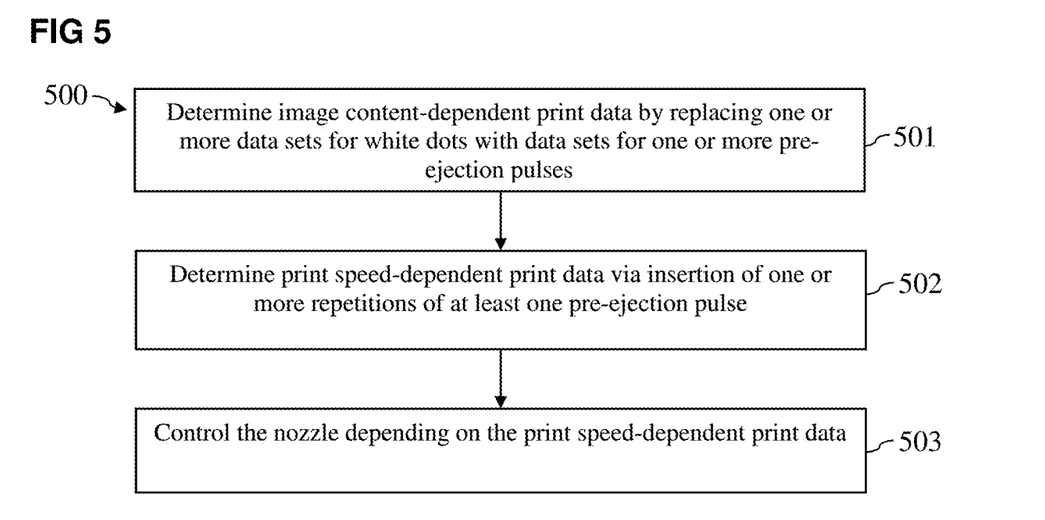
FIG. 5 is a flowchart of a method for controlling a nozzle of an inkjet printing device according to an exemplary embodiment.

FIG. 5 shows a workflow diagram of an example of a method 500, if applicable a computer-implemented method, for determining print speed-dependent print data for the operation of at least one nozzle 21, 22 of an inkjet printing device 100. The printing device 100 is configured to print a print image onto a recording medium 120. The printing device 100 typically comprises a plurality of nozzles 21, 22, wherein each nozzle 21, 22 is configured to print dots of a respective column 31, 32 of the print image onto the recording medium 120. The method 500 may thus be aimed at automatically enabling a consistently high print quality of the printing device 100 at different print speeds.

In an exemplary embodiment, the method 500 includes the determination 501 of image content-dependent print data 310 on the basis of basic print data 300 for the print image to be printed. For a sequence of lines of the print image, the basic print data 300 may thereby respectively indicate whether a non-white dot or a white dot is to be printed in the respective line. In particular, the basic print data 300 for the sequence of lines comprise a corresponding sequence of data sets 302, 301. Examples of data sets 301, 302 are thereby a data set 301 for a non-white dot and a data set 302 for a white dot. A data set 301, 302 may comprise a sequence of bits that respectively form a code, for example a code for printing a non-white dot or a code for printing a white dot. Via the sequence of bits, in particular via the code, it may for example be indicated whether an ink droplet should be ejected or not for the respective line; and if applicable, what quantity of ink should be ejected.

The determination 501 of the image content-dependent print data 310 includes the replacement of at least one data set 302 for a white dot by a data set 303 for a pre-ejection pulse, wherein a pre-ejection pulse is designed to move ink in the nozzle 21, 22 without producing an ink ejection. In particular, a data set 302 for a white dot may thereby be replaced that is arranged in the line directly before or in the penultimate line before a data set 301 for a non-white dot, in order to prepare the nozzle 21, 22 for the printing of the non-white dot. If applicable, a plurality of data sets 302 for white dots may be replaced by a corresponding number of data sets 303 for pre-ejection pulses.

Image content-dependent print data 310 may thus be generated from the basic print data 300, wherein the image content-dependent print data 310 have the same number of data sets 301, 302, 303, 304 as the basic print data 300. In particular, the image content-dependent print data 310 and/or the basic print data 300 for each line of the print image may have precisely one data set 301, 302, 303, 304 for the respective nozzle 21, 22. Moreover, the image content-dependent print data 310 and/or the basic print data 300 may possibly have no additional data sets.

In an exemplary embodiment, the image content-dependent print data 310 may be generated from the basic print data 300 by the controller 101 of the printing device 100. In an exemplary embodiment, the controller 101 is superordinate to the print heads 103 or the print bars 102 for the different print colors.

In an exemplary embodiment, the method 500 also includes the determination 502 of print speed-dependent print data 330 on the basis of the image content-dependent print data 310. This may take place via insertion of one or more repetitions of a pre-ejection pulse inserted into the image content-dependent print data 310. The one or more repetitions of the pre-ejection pulse may thereby be inserted depending on the actual print speed with which successive lines of the print image are to be printed onto the recording medium. The number of inserted repetitions of the pre-ejection pulse may thereby be increased with decreasing actual print speed.

Furthermore, the method 500 may include the activation 503 of the nozzle 21, 22 of the printing device 100 to print the print image, in particular to print the corresponding column 31, 32 of the print image, on the basis of the print speed-dependent print data 330.

A method 500 is thus described in which white dots in the basic print data 300 for a nozzle 21, 22 of a printing device 100 are replaced by pre-ejection pulses. Furthermore, depending on the actual print speed of the printing device 100, one or more repetitions of the pre-ejection pulses are inserted into the print data 310 in order to determine print speed-dependent print data 330 with which the nozzle 21, 22 is controlled.

An optimized print quality of a printing device 100 may be produced for a plurality of different print speeds using the replacement of one or more white dots from the basic print data for a print image by one or more corresponding pre-ejection pulses, and via the subsequent repetition of the pre-ejection pulses under consideration of the actual print speed.

The image content-dependent print data 310 may be associated with a nominal print speed of the printing device 100, for example with a maximum possible print speed. The nominal print speed thereby corresponds to a nominal line timing with which directly successive lines of a print image are printed.

To determine the print speed-dependent print data 330, the method 500 may include the insertion of up to or of precisely (N−1) repetitions of the pre-ejection pulse if the actual print speed is less than the nominal print speed by a factor of N or more. By reducing the actual print speed relative to the nominal print speed, a respective time gap 308 is created between two directly successive lines, which time gap 308 may be used to operate the nozzle 21, 22 with one or more, in particular with up to N−1, repetitions of the pre-ejection pulse. A drying out of the ink in the nozzle 21, 22 may thus be reliably avoided even given a relatively low print speed.

In an exemplary embodiment, the method 500 may include the limiting of the number of repetitions of the pre-ejection pulse to a maximum permitted number of repetitions if the actual print speed is equal to or less than a minimum speed. Alternatively or additionally, the method 500 may include limiting the total number of pre-ejection pulses that take place due to inserted repetitions of pre-ejection pulses before, if applicable directly before, the printing of a non-white dot to a maximum permissible total number of pre-ejection pulses.

It may thus be brought about that only a limited number of pre-ejection pulses is generated before the printing of a line with a non-white dot. A clumping of the ink in the nozzle 21, 22 due to an excessive number of pre-ejection pulses may thus be reliably avoided. As a result of this, the print quality of the printing device 100 may be further increased.

Within the scope of the method 500, directly successive lines with white dots that, in the basic image data 300, are arranged directly before a line with a non-white dot may be determined. At least a portion of the data sets 302 for the directly successive lines with white dots may then be replaced by a respective data set 303 for a pre-ejection pulse in order to determine the image content-dependent print data 310.

The data sets 302 for the directly successive lines with white dots may be replaced at least in part by a respective data set 303 for a pre-ejection pulse, such that the image content-dependent print data 310 for the first line that is arranged directly before the line with the non-white dot furthermore have data set 302 for a white dot. A rest phase to rest the ink in the nozzle 21, 22 may thus be provided shortly before the printing of a non-white dot. The print quality of the printing device 100 may thus be further increased.

Furthermore, the replacement may take place such that the image content-dependent print data 310 for one or more lines arranged directly before the first line respectively have a data set 303 for a pre-ejection pulse. A reliable regeneration of the ink of the nozzle 21, 22 may thus be produced.

The number of data sets 302 for the directly successive lines with white dots that are replaced by a respective data set 303 for a pre-ejection pulse may depend on the actual print speed. In particular, the number of data sets 302 for the directly successive lines with white dots that are replaced by a respective data set 303 for a pre-ejection pulse may decrease with decreasing actual print speed. For example, the method 500 may include reducing the number of data sets 302 for the directly successive lines with white dots that are replaced by a respective data set 303 for a pre-ejection pulse if the actual print speed is less than a speed threshold. Alternatively or additionally, the method 500 may include increasing the number of data sets 302 for the directly successive lines with white dots that are replaced by a respective data set 303 for a pre-ejection pulse if the actual print speed is greater than a speed threshold.

The actual print speed may thus already be taken into account in the determination of the image content-based print data 310, and in particular in the determination of the number of white dots that are replaced by pre-ejection pulses. An excessive number of pre-ejection pulses may thus be particularly reliably avoided, and the print quality of the printing device 100 may be further increased. Furthermore, a respective high print quality may be provided for different print speeds.

Moreover, in this document an inkjet printing device 100 is described that comprises at least one nozzle 21, 22, which inkjet printing device 100 is designed to print dots for a sequence of lines of a print image onto a recording medium 120.

The printing device 100 also comprises at least one control means 101, 104 that is configured to determine image content-dependent print data 310 on the basis of basic print data 300 for the print image to be printed. The image content-dependent print data 310 may thereby be determined by replacing at least one data set 302 for a white dot from the basic print data 300 with a data set 303 for a pre-ejection pulse.

In an exemplary embodiment, the controller 101, 104 is also configured to determine print speed-dependent print data 330 on the basis of the image content-dependent print data 310 via insertion of one or more repetitions of the pre-ejection pulse. The one or more repetitions of the pre-ejection pulse may thereby be inserted depending on the actual print speed with which successive lines of the print image are to be printed onto the recording medium 120. In particular, the number of repetitions of the pre-ejection pulse may depend on how far the actual print speed is below the nominal print speed of the printing device.

The nozzle 21, 22 of the printing device 100 may then be controlled to print the print image on the basis of the print speed-dependent print data 330.

In an exemplary embodiment, the printing device 100 may in particular comprise a controller 101 that is configured to determine the image content-dependent print data 310 on the basis of the basic print data 300. The controller 101 may thereby be configured to coordinate the printing of a print image at a plurality of print bars 102 for a corresponding plurality of different colors or inks.

Furthermore, the controller 101 may be configured to determine the basic print data 300 for the print image to be printed on the basis of image data for the print image to be printed, via application of a rastering process 411 and/or of a halftone process 412.

The printing device 100 may also comprise a print head 103 having the nozzle 21, 22, wherein the print head 103 may be part of a print bar 102, for example as presented in conjunction with FIG. 1.

The print head 103 and/or the print bar 102 may comprise a controller 104 that is configured to determine speed information 407 with respect to the actual print speed. The controller 104 may be configured to coordinate the actions of the one or more print heads 103 of a print bar 102. Each print bar 102 may, if applicable, thereby comprise a separate controller 104.

The controller 104 may also be configured to receive the image content-dependent print data 310 from the controller 101 of the printing device 100. Moreover, the controller 104 may be configured to determine the print speed-dependent print data 330 from the image content-dependent print data 310, depending on the speed information 407. The nozzle 21, 22 may be controlled by the controller 104 on the basis of the print speed-dependent print data 330.

A procedural division may thus take place between the insertion of pre-ejection pulses into the basic print data 300 by the superordinate controller 101 and the speed-dependent insertion of repetitions of the inserted pre-ejection pulses by the one or more controllers 104 of the one or more print bars 102. The print quality of the printing device 100 may thus be particularly efficiently increased.

To enable those skilled in the art to better understand the solution of the present disclosure, the technical solution in the embodiments of the present disclosure is described clearly and completely below in conjunction with the drawings in the embodiments of the present disclosure. Obviously, the embodiments described are only some, not all, of the embodiments of the present disclosure. All other embodiments obtained by those skilled in the art on the basis of the embodiments in the present disclosure without any creative effort should fall within the scope of protection of the present disclosure.

It should be noted that the terms "first", "second", etc. in the description, claims and abovementioned drawings of the present disclosure are used to distinguish between similar objects, but not necessarily used to describe a specific order or sequence. It should be understood that data used in this way can be interchanged as appropriate so that the embodiments of the present disclosure described here can be implemented in an order other than those shown or described here. In addition, the terms "comprise" and "have" and any variants thereof are intended to cover non-exclusive inclusion. For example, a process, method, system, product or equipment comprising a series of steps or modules or units is not necessarily limited to those steps or modules or units which are clearly listed, but may comprise other steps or modules or units which are not clearly listed or are intrinsic to such processes, methods, products or equipment.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general-purpose computer.

For the purposes of this discussion, the term "processing circuitry" shall be understood to be circuit(s) or processor(s), or a combination thereof. A circuit includes an analog circuit, a digital circuit, data processing circuit, other structural electronic hardware, or a combination thereof. A processor includes a microprocessor, a digital signal processor (DSP), central processor (CPU), application-specific instruction set processor (ASIP), graphics and/or image processor, multi-core processor, or other hardware processor. The processor may be "hard-coded" with instructions to perform corresponding function(s) according to aspects described herein. Alternatively, the processor may access an internal and/or external memory to retrieve instructions stored in the memory, which when executed by the processor, perform the corresponding function(s) associated with the processor, and/or one or more functions and/or operations related to the operation of a component having the processor included therein. In one or more of the exemplary embodiments described herein, the memory is any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

REFERENCE LIST 1 transport direction
21, 22 nozzle (print image)
31, 32 column (of the print image)
100 printing device
101 controller
102 print bar
103 print head
104 controller
110 print data
120 recording medium
130 timer
140 print group
201 nozzle opening
202 wall
210 meniscus
212 nozzle chamber
220 actuator
221, 222 deflection (actuator)
300 basic print data
301 data set for a non-white dot
302 data set for a white dot
303 data set for a pre-ejection pulse
304 data set for a rest phase
305 data set for a repetition of the preceding data set
306 actual line timing signal
307 virtual line timing signal
308 time gap between two actual line timing signal
310 image content-based print data
320 temporally extended line timing signals
330 print speed-based print data
400 data processing of the print data for a print image
401 image data of a print image
411 rastering of the image data
402 rastered image data
412 conversion into halftones
403 halftone image (basic print data)
413 insertion of image content-dependent pre-ejection pulses
414 insertion of virtual lines to repeat pre-ejection pulses
415 adaptation of the print data to the arrangement of the nozzles of a print head
406 control data for a print head
407 print speed information
500 method for determining print speed-dependent print data
501-503 method steps

The invention claimed is:

1. A method for determining print speed-dependent print data for the operation of at least one nozzle of an inkjet printer configured to print a print image onto a recording medium, the method comprising:
    determining image content-dependent print data based on the basis of print data for the print image to be printed, the print data for a sequence of lines of the print image respectively indicate whether a non-white dot or a white dot is to be printed, wherein the determination of the image content-dependent print data includes replacing at least one data set for a white dot with a data set for a pre-ejection pulse, the pre-ejection pulse being configured to move ink in the nozzle without producing an ink ejection;
    inserting one or more repetitions of the pre-ejection pulse, based on an actual print speed between two successive lines of the print image that are to be printed onto the recording medium, to determine print speed-dependent print data based on the image content-dependent print data; and
    controlling the nozzle to print the print image based on the print speed-dependent print data,
    wherein the image content-dependent print data is associated with a nominal print speed of the inkjet printer, and the method further comprises, if the actual print speed is less than the nominal print speed by a factor of N or more, inserting (N−1) repetitions of the pre-ejection pulse.

2. The method according to claim 1, further comprising:
    limiting a number of repetitions of the pre-ejection pulse to a maximum allowable number of repetitions in response to the actual print speed being equal to or less than a minimum speed; and/or limiting a total number of pre-ejection pulses to a maximum allowable total number of pre-ejection pulses, the pre-ejection pulses resulting from inserted repetitions of pre-ejection pulses before the printing of a non-white dot.

3. The method according to claim 1, further comprising:

determining directly successive lines with white dots that, in the basic print data, are arranged directly before a line with a non-white dot; and replacing at least a portion of the data sets for the directly successive lines having white dots with a respective data set for a pre-ejection pulse, to determine the image content-dependent print data.

4. The method according to claim 3, wherein a number of data sets for the directly successive lines with white dots that are replaced by a respective data set for a pre-ejection pulse depends on the actual print speed.

5. The method according to claim 4, wherein:

the number of data sets for the directly successive lines with white dots that are replaced by a respective data set for a pre-ejection pulse decreases with decreasing actual print speed; and/or the method further comprises:

reducing the number of data sets for the directly successive lines having white dots that are replaced by a respective data set for a pre-ejection pulse in response to the actual print speed being less than a speed threshold; and/or increasing the number of data sets for the directly successive lines having white dots that are replaced by a respective data set for a pre-ejection pulse in response to the actual print speed being greater than a speed threshold.

6. The method according to claim 3, wherein the data sets for the directly successive lines having white dots are replaced, at least in part, by a respective data set for a pre-ejection pulse, such that the image content-dependent print data includes:

a data set for a white dot for a first line that is arranged directly before the line having the non-white dot; and a respective data set for a pre-ejection pulse for one or more lines arranged before the first line.

7. A non-transitory computer-readable storage medium with an executable program stored thereon, that when executed, instructs a processor to perform the method of claim 1.

8. An inkjet printer, comprising:

at least one nozzle configured to print dots for a sequence of lines of a print image onto a recording medium; and at least one controller configured to:

determine image content-dependent print data for the print image to be printed based on basic print data, the basic print data for the sequence of lines of the print image respectively indicating whether a non-white dot or a white dot is to be printed by the nozzle, wherein the image content-dependent print data is determined by replacing at least one data set for a white dot from the basic print data with a data set for a pre-ejection pulse, the pre-ejection pulse being configured to move ink in the nozzle without producing an ink ejection;

insert one or more repetitions of the pre-ejection pulse to determine print speed-dependent print data based on the image content-dependent print data, wherein the one or more repetitions of the pre-ejection pulse are inserted depending on an actual print speed with which between two successive lines of the print image that are to be printed onto the recording medium; and activate the nozzle, based on the print speed-dependent print data, to print the print image, wherein the image content-dependent print data is associated with a nominal print speed of the inkjet printer, and the controller is further configured to, if the actual print speed is less than the nominal print speed by a factor of N or more, insert (N−1) repetitions of the pre-ejection pulse.

9. The printer according to claim 8, wherein:

the controller is configured to determine the image content-dependent print data based on the basic print data;

the printer further comprises a print head having the nozzle and a print head controller; and the print head controller is configured to:

determine speed information with respect to the actual print speed;

receive the image content-dependent print data from the controller;

determine the print speed-dependent print data from the image content-dependent print data depending on the speed information; and control the nozzle based on the print speed-dependent print data.

10. The printer according to claim 9, wherein the controller is configured to determine the basic print data for the print image to be printed based on image data for the print image to be printed, via application of a rastering process and/or a halftone process.

* * * * *